United States Patent [19]

Shepherd et al.

[11] Patent Number: 5,069,401
[45] Date of Patent: Dec. 3, 1991

[54] COMPARTMENT PARTITION AND PRESSURE RELIEF DOOR THEREFOR

[75] Inventors: William R. Shepherd, Seattle; James H. Huentelman, Kirkland, both of Wash.

[73] Assignee: The Boeing Company, Seattle, Wash.

[21] Appl. No.: 438,138

[22] Filed: Nov. 15, 1989

[51] Int. Cl.$^5$ .................. B64D 11/00; B64D 13/00
[52] U.S. Cl. ............................ 244/118.5; 244/129.5; 160/329; 454/71
[58] Field of Search .................. 244/129.4, 118.5, 119, 244/117 R, 129.5; 98/1.5; 160/328, 329, 354, 368.1

[56] References Cited

U.S. PATENT DOCUMENTS

| | | | |
|---|---|---|---|
| 2,618,332 | 11/1952 | Gwynne | 160/328 |
| 2,679,467 | 5/1954 | Sherts | 154/2.73 |
| 2,748,855 | 6/1956 | Siems et al. | 244/129.5 |
| 3,571,977 | 3/1971 | Abeel | 98/1.5 |
| 4,390,152 | 6/1983 | Jorgensen | 244/118.5 |
| 8,101,950 | 7/1981 | Krogseng | 160/329 |

Primary Examiner—Joseph F. Peters, Jr.
Assistant Examiner—Christopher P. Ellis
Attorney, Agent, or Firm—R. H. Sproule; B. A. Donahue

[57] ABSTRACT

A reuseable panel for equalizing pressure between adjacent compartments includes a frame and a movable floor which is releasably sandwiched within the frame on three sides. When there is a sufficiently large pressure differential between the compartments, the three sides of the door are dislodged from the frame (blowout) thereby exposing an opening to allow the pressure between the compartments to equalize. In order to provide additional control over the pressure at which door blowout occurs, one end of a flexible strap is fixedly attached to the door while the other end is removably connected to an attachment bracket which is fixed to the frame. By adjusting (i) the configuration of the attachment bracket, (ii) the depth at which the door is sandwiched within the frame, (iii) the number of attachment brackets, (iv) the position of the attachment brackets, and (v) the side of the frame on which the attachment brackets are mounted, the pressure differential at which door blowout occurs can be adjusted.

16 Claims, 2 Drawing Sheets

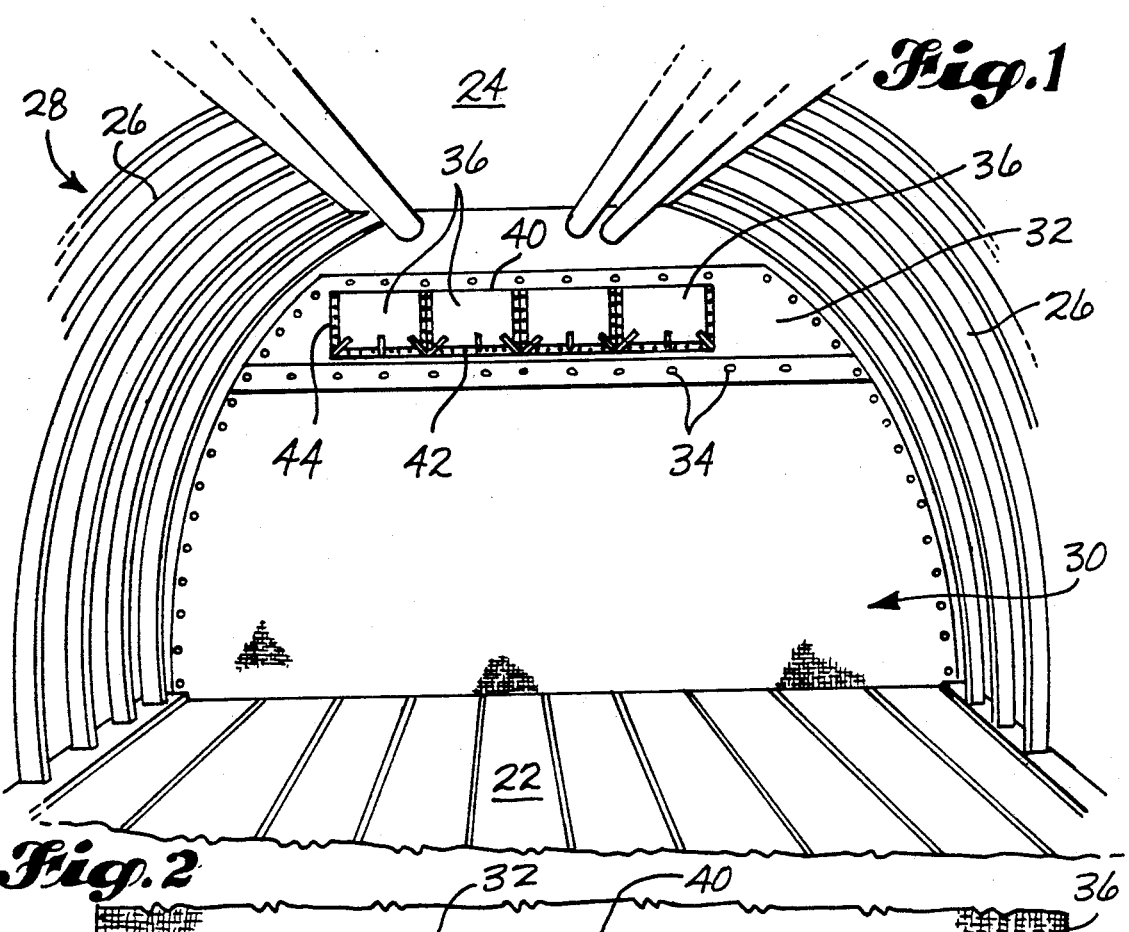
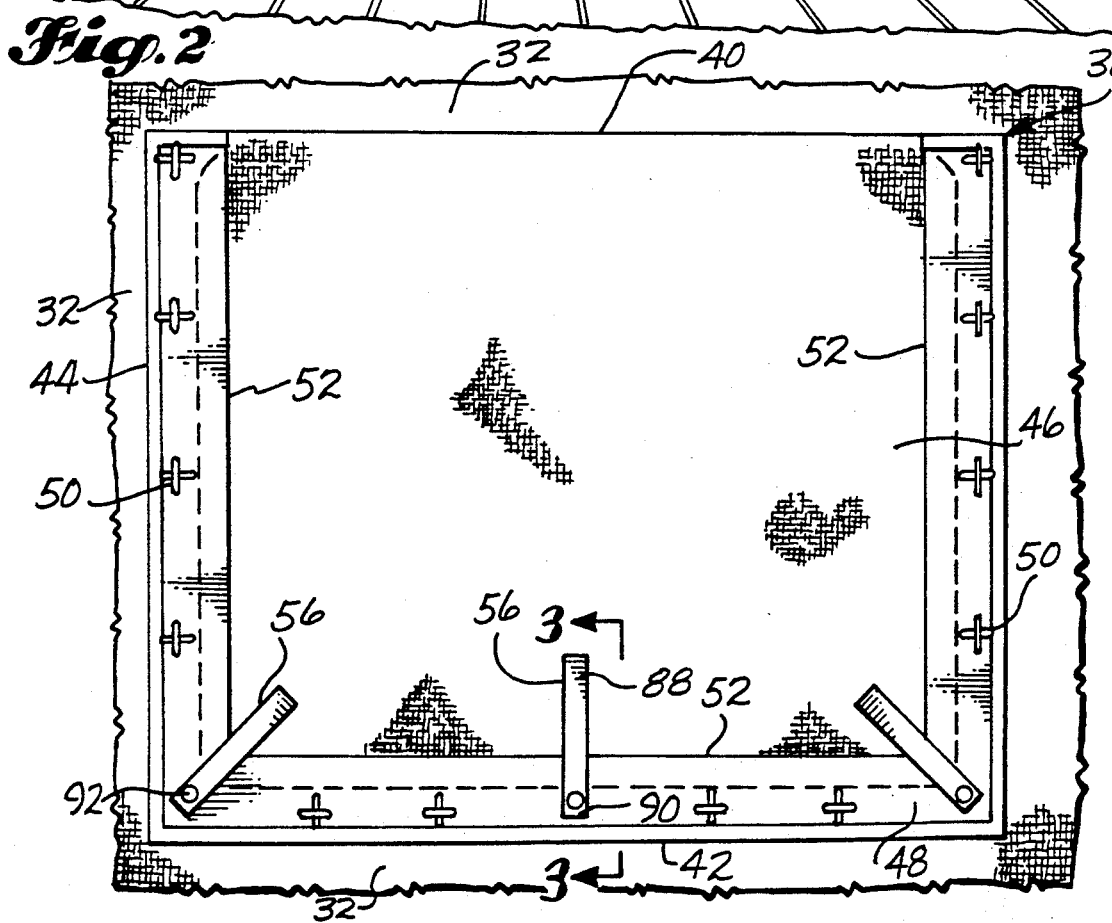

COMPARTMENT PARTITION AND PRESSURE RELIEF DOOR THEREFOR

TECHNICAL FIELD

The present invention pertains to a device for relieving overpressurization of a compartment, and more specifically to a reuseable pressure relief door for an aircraft compartment.

BACKGROUND OF THE INVENTION

Some commercial aircraft known as "combis" carry both passengers and cargo on the main deck. Typically the passengers and cargo are separated by a partition which divides the interior of the aircraft into a forward passenger compartment and an aft cargo compartment.

In the event of fire in the cargo compartment, it is desirable to prevent air from entering the cargo compartment or smoke from entering the passenger compartment. In order to accomplish this, the partition between the cargo and passenger compartments is made nearly airtight. However, the possibility of rapid decompression of the aircraft passenger or cargo compartments requires some means for equalizing the pressure differential between these compartments so as to prevent structural damage to the dividing partition.

Conventionally, a number of explosive decompression panels have been disclosed for relieving a pressure differential across a wall. Typically, when the pressure differential is sufficiently large, these conventional panels either break or are ejected thereby allowing a rapid equalization of pressure. Common problems associated with these conventional decompression panels include the fact that they are not reuseable and they do not provide a simple mechanism for adjusting the pressure at which panel "blowout" occurs.

SUMMARY OF THE INVENTION

The present inventions pertains to apparatus for equalizing a pressure differential between two compartments. The apparatus includes a movable door as well as means for supporting the movable door. The supporting means, such as fabric material, separates the two compartments to maintain the pressure differential therebetween. In addition, the supporting means includes an opening which communicates between the two compartments. The door is supported in a manner that the door moves between a first position covering the opening so as to maintain the pressure differential, and a second position not covering the opening so as to reduce the pressure differential. The apparatus also includes attachment and release means having a first part which is attached to the door and a second part which is attached to the supporting means. The attachment and release means maintains the door in the first position until reaching a selected pressure differential, and releases the door to the second position when the selected pressure differential is reached.

BRIEF DESCRIPTION OF THE DRAWINGS

These and other features of the present invention will be described in greater detail in the following Detailed Description in conjunction with the attached drawings, in which:

FIG. 1 is an isometric view of an exemplary embodiment of the present invention wherein an aircraft cargo compartment includes a nearly airtight partition which incorporates the overpressurization panel of the present invention;

FIG. 2 is a plan view of the overpressurization panel of the present invention;

DETAILED DESCRIPTION

Figure 4:
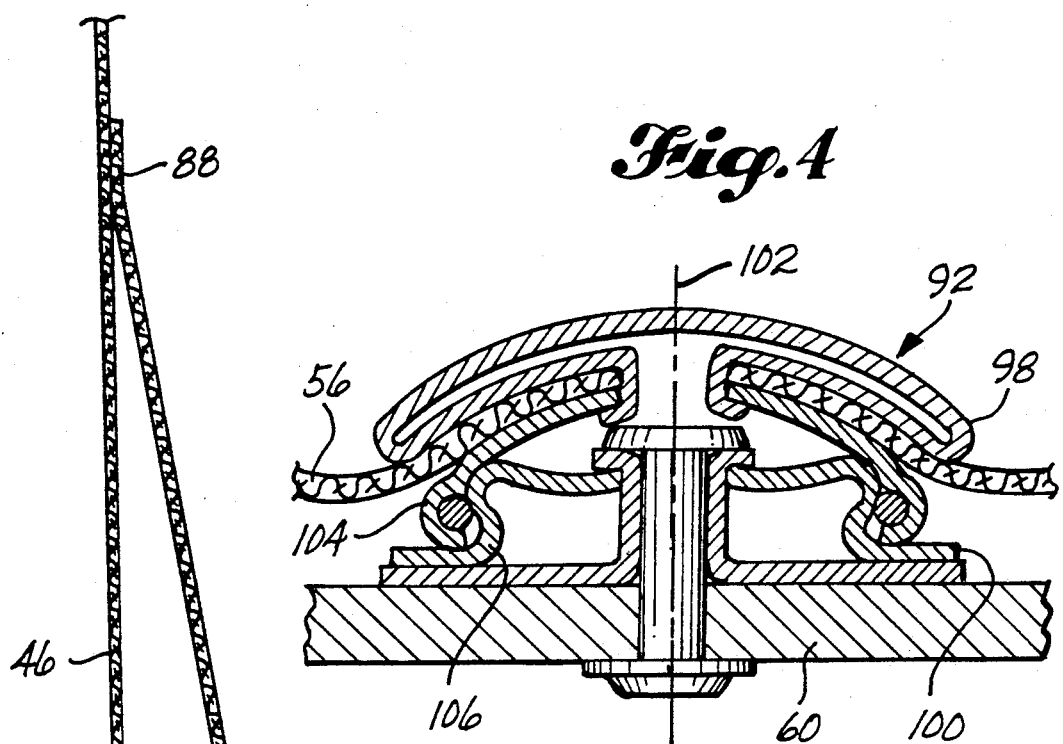
FIG. 4 is a side sectional view of a conventional "snap button" fastener.

In an exemplary embodiment, the present invention will be described as an overpressurization panel for equalizing pressure in adjoining compartments of an aircraft. However it should be understood that the panel of the present invention may be used in any instance, including non-aircraft applications, where it is desirable to have a device which opens when a selected pressure differential is reached.

Referring to the exemplary embodiment of FIG. 1, there is shown the interior of an airplane cabin including a floor 22, ceiling 24, and sidewalls 26. Separating a cargo compartment generally indicated at 28 from a forward passenger compartment (not shown) is a compartment partition indicated at 30. In order to prevent air from flowing between the cargo compartment and the passenger compartment, the partition 30 includes a number of removable fabric covers, only one of which is shown and identified by the number 32. Fabric cover 32 is attached to portions of the partition 30 by conventional fasteners 34 so as to seal existing openings in the partition 30 and to make the partition nearly airtight.

Attached to the fabric cover 32 are a number of unique overpressurization panels 36; only one of which will be described herein since each of the overpressurization panels 36 is substantially identical. As shown in FIG. 1, each overpressurization panel 36 includes a top horizontal edge 40, a bottom horizontal edge 42, and left and right vertical side edges 44.

Referring now to FIG. 2, the overpressurization panel 36 is shown in greater detail to include a fabric door 46 and a rigid frame 48. In the exemplary embodiment shown in FIG. 2, the fabric door 46 has a rectangular shape and the frame 48 is U-shaped. In the present embodiment, the top 40 of the door 46 is sewn or otherwise bonded to a portion of the fabric cover 32, while the frame 48 is connected to other portions of the fabric cover 32 by conventional fasteners 50. In order to provide pressure equalization, three edges 52 of the door 46 are releasably sandwiched within the frame 48. When a sufficient pressure differential is created across the door 46, the edges 52 of the door 36 pull out from between the frame 48 thereby exposing an opening between the passenger and cargo compartments.

In the present embodiment, the edges 52 are held within the frame 36 in an interference fit. In addition, the door 36 is prevented from pulling out from between the frame 48 by flexible straps 56 until a predetermined pressure differential is reached. Each strap 56 has one end attached to the door 46 and the other end attached to the frame 48 by means of an attachment bracket 60 (FIG. 3) which will be described in detail later.

Figure 3:
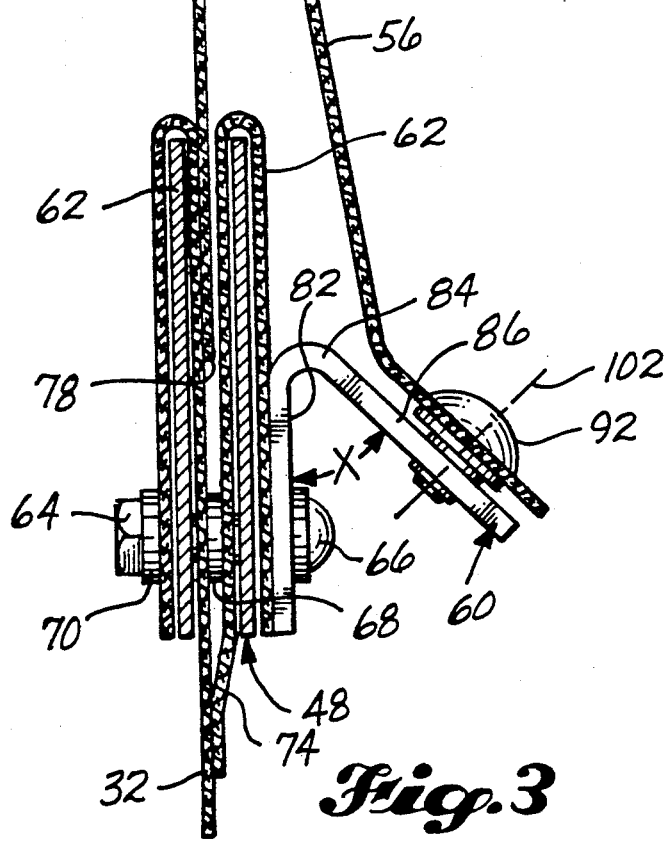
FIG. 3 is a side sectional view of the overpressurization panel taken along lines 3—3 of FIG. 2.

Referring now to FIG. 3 there is shown a side sectional view of the overpressurization panel including left and right flat U-shaped frame strips 62 which form the U-shaped frame 48 and which are held together by a number of conventional fasteners such as the nut 64 and bolt 66 combination shown in FIG. 3. Supported on the shaft of the bolt 66 and sandwiched between the frame strips 62 is a spacer washer 68 having a function which will be described shortly. As shown in FIG. 3, the edges of the frame 48 are secured to the fabric cover 32 in a manner that the fabric cover 32 extends upwardly between the frame strips 62 and wraps around the upper edge of the left frame strip and doubles back along the outer surface of the left frame strip where it is secured thereto by a washer 70 adjacent to the nut 64. In order to "wrap" the upper edge of the right frame strip 62, a section 74 of fabric is attached to the fabric cover 32 near the lower edges of the frame 48 This fabric section 74 extends between the frame strips 62 and wraps around the upper edge of the right frame strip 62 and doubles back along its outer edge where it is secured thereto by the head of the bolt 66. This "wrapping" of the frame strip sides and upper edges helps provide a smooth surface to facilitate the pulling away of the door 46 from between the frame when the predetermined pressure differential has been reached.

As further shown in FIG. 3, an outer perimeter section 78 of the door 46 is inserted between the wrapped frame strips 62. This may be accomplished by using a conventional flat elongate tool to insert the outer perimeter section between the frame strips. In the event the door is dislodged from the frame either by accident or due to an overpressure condition, the door 46 can be reinserted into the frame using the aforementioned flat tool. In the present embodiment, the force required to dislodge the outer perimeter section 78 from the frame is a function of (i) the depth that the outer perimeter section 78 is inserted between the frame strips 62, as well as (ii) the thickness of the washer 68. More specifically, when the outer perimeter section 78 is inserted between the frame strips to a greater depth, then a greater force (pressure differential) is required to dislodge the outer perimeter section 78 from the panel frame. Similarly, by decreasing the thickness of the washer 68 and thereby positioning the frame strips 48 to provide a tighter fit against the outer perimeter section 78, a greater force is required to dislodge the door 46 from the frame.

In order to more precisely control the dislodging of the door 46 from the frame, the V-shaped attachment bracket 60 (FIG. 3) is attached over the fabric wrap to the outer face of either the left or right frame strips 62. More specifically, in the embodiment shown in FIG. 3 the attachment bracket 60 includes a first flat portion 82 which is attached to the outer face of the right frame strip 62 by the bolt 66. The flat portion 82 extends upwardly across the frame panel toward the door 46 to a curved end section 84 where it is joined to a second flat portion 86 which extends away from and forms an angle with the first flat portion 82; this angle being designated by a letter "x". Connecting the panel door 46 to the attachment bracket is the flexible strap 56 which has an upper end 88 attached to the door 46 and a lower end 90 attached to the second flat portion 86 of the attachment bracket by a conventional "snap button" fastener 92.

In the present embodiment the strap 56 is sized so that it is taut when it is attached to the attachment bracket 60. In this manner, the pressure differential required to dislodge the door 46 from the frame must dislodge the snap button 92 from the attachment bracket 60. This allows for convenient adjustment of the pressure differential required to dislodge the panel door. For example, assume in FIG. 3 that the cargo compartment is to the left of the fabric door and the passenger compartment is to the right of the fabric door. In the event of rapid decompression of the passenger compartment, a greater pressure will be exerted on the left side of the panel door 46. In this case, the force required to dislodge the panel door will be relatively small. However, in the event of rapid decompression of the cargo compartment, a greater pressure will be applied to the right side of the panel door 46. In this instance, a much larger force is required to dislodge the fabric door. This allows for the selection of different release pressures depending upon which side of the frame the attachment clip 60 is located. More specifically, as shown in FIG. 4 the snap button 92 includes a circular cap 98 which is inserted in a friction-tight fit over a circular base 100 along an attachment axis shown by a line designated by a number 102. The minimum force required to pull the cap 98 away from the base 100 will be along axis 102. However, this force approaches a maximum as the force vector approaches an angle of ninety degrees to the axis 102 because sides 104 of the cap 98 extend downward over sides 106 of the base 100. Therefore when the attachment bracket 60 is located on the higher pressure side of the frame during decompression, the major component of the force acting on the snap button 92 is a shear component. However, when the attachment bracket 60 is located on the lower pressure side of the frame during decompression, the major component of force acting on the snap button 92 is a tension component.

In the case where the attachment bracket 60 is located on the higher pressure side of the frame during decompression (FIG. 3), the force required to blow out the door is also a function of the angle x. More specifically, if the bracket 60 is bent to increase the angle x, then the force required to remove the snap button 92 from the attachment bracket 60 is decreased. Therefore, by selectively changing angle x of the attachment bracket 60 when the direction of force is away from the attachment clip, the force required to remove the snap button 92 and to thereby dislodge the panel door 46 from the frame can be adjusted. That is, by increasing angle x, the pulling force exerted by the strap 56 is increasingly aligned with the axis 102, thereby selecting a lower pressure differential for dislodging of the door from the frame ("blowout").

Consequently, the panel door can be selected to "blow out" at a predetermined pressure differential by adjustment of 1) the width of washer 68 (FIG. 3), 2) the number of attachment brackets 60, 3) the angle x of the attachment bracket, 4) the position of the attachment bracket on the frame, 5) the side of the frame on which the attachment bracket s mounted, and 6) the depth at which the outer perimeter section 78 is inserted between the frame strips 62. In addition, the blowout pressure can be altered by changing the area or geometry of the blowout door. In other words, all things being equal, a door with a larger surface area will require less pressure to blowout from the frame. The thickness of the fabric also affects the pressure at which blowout occurs in that a thicker fabric requires a greater pressure to blowout the door.

In a further exemplary embodiment, the overpressurization panel will provide rapid decompression relief across a crown-floor smoke seal separating the passenger and cargo sections of the Boeing model 747 Combi aircraft. In order to protect surrounding structure, the overpressurization panel is required to "blow" at a very low pressure differential. However, being part of a smoke seal, the panel is nearly airtight at those pressures which are typically generated during a fire in the cargo compartment during flight. These "fire condition" pressure differentials are expected to be within 0.05 psi of the maximum desired blowout pressure.

What is claimed is:

1. Apparatus for equalizing a pressure differential between first and second bodies, the apparatus comprising:
   a. a movable door;
   b. means for supporting the movable door, the supporting means (i) being connected between the first and second bodies to maintain the pressure differential therebetween and having an opening which communicates between the first and second bodies, (ii) supporting the door in a manner that the door moves between a first position covering the opening so as to maintain the pressure differential and a second position not covering the opening so as to reduce the pressure differential, the supporting means further including a frame having first and second frame portions which releasably engage the movable door therebetween in the first position and in a manner that when a selected pressure is reached, the movable door is dislodged from between the first and second frame portions by the force of the pressure differential; and
   c. attachment and release means, having a first part which is attached to the door and a second part which is attached to the supporting means, for maintaining the door in the first position until reaching the selected pressure differential, and for releasing the door to the second position when the selected pressure differential is reached.

2. The apparatus as set forth in claim 1 wherein the attachment and release means includes a strap having a first end which is attached to the movable door and a second end which is releasably attached to the frame in a manner that when the pressure differential reaches the selected pressure differential, the second end of the strap is released from the frame to permit the door to move to the second position.

3. The apparatus as set forth in claim 2 wherein the strap is released attached to the frame by a fastener which separates due to a force exerted on the fastener by the strap due to the pressure differential.

4. The apparatus as set forth in claim 3 wherein:
   a. the fastener separates in a fastener release direction when the selected pressure differential is reached;
   b. the frame includes an attachment element to which the fastener is releasably attached, the attachment element having a first configuration which allows the fastener to separate at a lower pressure differential and a second configuration which allows the fastener to separate at a higher pressure differential.

5. The apparatus as set forth in claim 4 wherein the first configuration of the attachment element is such that the force from the door transmitted by the strap has a direction which is closer to the fastener release direction of the fastener than that force transmitted by the strap to the fastener when the attachment element is in the second configuration.

6. The apparatus as set forth in claim 5 wherein the attachment element has first and second portions which form a first angle in the first configuration and a second angle in the second configuration so that the force transmitted by the strap to the fastener is closer to the fastener release direction than in the first configuration.

7. Apparatus for partitioning an aircraft, the apparatus comprising:
   a. a movable door;
   b. partition means for supporting the movable door, the partition means including (i) a partition for separating the aircraft into first and second compartments so as to maintain a pressure differential therebetween and having an opening which communicates between the compartments, and (ii) means, connected to the partition, for supporting the door in a manner that the door moves between a first position covering the opening so as to maintain the pressure differential and a second position not covering the opening so as to reduce the pressure differential, the supporting means further including a frame having first and second frame portions which releasably engage the door therebetween in the first position and in a manner that when the selected pressure is reached, the door is dislodged from between the first and second frame portions by the force of the pressure differential; and
   c. attachment and release means, having a first part which is attached to the door and a second part which is connected to the partition means, for maintaining the door in the first position until reaching the selected pressure differential, and for releasing the door to the second position when the selected pressure differential is reached, the attachment and release means, in cooperation with the frame, maintaining the door in the first position until the selected pressure is reached, and then releasing the door to the second position in response to the pressure differential.

8. The apparatus as set forth in claim 7 wherein the attachment and release means includes a strap having a first end which is attached to the movable door and a second end which is releasably attached to the frame in a manner that when the pressure differential reaches the selected pressure differential, the second end of the strap is released from the frame to permit the door to move to the second position.

9. The apparatus as set forth in claim 8 wherein the strap is released attached to the frame by a fastener which separates due to a force exerted on the fastener by the strap due to the pressure differential.

10. The apparatus as set forth in claim 9 wherein:
    a. the fastener separates in a first direction when the selected pressure differential is reached;
    b. the frame includes an attachment element to which the fastener is releasably attached, the attachment element having a first configuration which allows the fastener to separate at a lower pressure differential and a second configuration which allows the fastener to separate at a higher pressure differential.

11. The apparatus as set forth in claim 10 wherein the first configuration of the attachment element is such that the force from the door transmitted by the strap has a direction which is more closely aligned with to the first direction than that force transmitted by the strap to the fastener when the attachment element is in the second configuration.

12. The apparatus as set forth in claim 1 wherein the frame includes first and second frame portions which releasably engage an edge portion of the movable door therebetween in a sandwich-like fit in the first position and in a manner that when the selected pressure differential is reached, the door is dislodged from between the first and second frame portions by the pressure differential.

13. The apparatus as set forth in claim 1 wherein the frame includes first and second frame portions which are located about a perimeter of the movable door and which releasably engage an edge portion of the movable door therebetween in a friction-tight fit in the first position and in a manner that when the selected pressure differential is reached, the movable door is dislodged from between the first and second frame portions by the pressure differential.

14. The apparatus as set forth in claim 7 wherein the attachment and release means includes strap means which are releasably connected between the door and the partition means such that when the selected pressure differential is reached, the strap means releases the door and the door is dislodged from between the first and second frame portions by the pressure differential.

15. The apparatus as set forth in claim 7 wherein the attachment and release means includes strap means which are releasably connected between the door and the partition means such that when the selected pressure differential is reached, the strap means is disconnected from between the door and the partition means in response thereto thereby allowing the door to be dislodged from between the first and second frame portions by the pressure differential.

16. A method of equalizing a pressure differential between first and second bodies, the method comprising the steps of:
  a. providing partition means between the first and second bodies to maintain the pressure differential therebetween;
  b. providing an opening in the partition means which communicates between the first and second bodies;
  c. attaching a door to the partition means in a manner that the door moves between a first position covering the opening so as to maintain the pressure differential and a second position not covering the opening so as to reduce the pressure differential;
  d. releasably engaging the door in the first position between first and second frame portions which form a portion of the partition means in a manner that when a selected pressure is reached, the movable door is dislodged from between the first and second frame portions by the pressure differential; and
  e. providing attachment and release means, having a first part which is attached to the door and a second part which is attached to the partition means, for maintaining the door in the first position until reaching the selected pressure differential, and for releasing the door to allow the door to be dislodged from between the first and second frame portions to the second position when the selected pressure differential is reached.

* * * * *